United States Patent [19]

Kimura et al.

[11] Patent Number: 4,890,166
[45] Date of Patent: Dec. 26, 1989

[54] EXPOSURE CONTROL DEVICE IN AN ELECTRONIC STILL CAMERA

[75] Inventors: Keita Kimura; Norihiko Takatsu, both of Tokyo; Tetsuya Yamamoto, Hasuda, all of Japan

[73] Assignee: Nikon Corporation, Tokyo, Japan

[21] Appl. No.: 180,848

[22] Filed: Apr. 12, 1988

[30] Foreign Application Priority Data

Apr. 20, 1987 [JP] Japan .................................. 62-97138

[51] Int. Cl.[4] ............................................. H04N 5/238
[52] U.S. Cl. .............................. 358/228; 358/213.19; 358/909; 358/296
[58] Field of Search ...................... 358/213.19, 213.13, 358/228, 909, 29 C

[56] References Cited

U.S. PATENT DOCUMENTS 4,774,564 9/1988 Konishi .................................. 358/29

FOREIGN PATENT DOCUMENTS 172487 8/1986 Japan .

Primary Examiner—James J. Groody
Assistant Examiner—Robert M. Bauer
Attorney, Agent, or Firm—Shapiro and Shapiro

[57] ABSTRACT

An electronic still camera includes a photo-taking lens, color temperature detector for detecting the color temperature of the outside of the camera including an object, an image pickup for accumulating therein charges according to the incident light from the object passed through the photo-taking lens, a regulator for regulating the picture signal from the image pickup on the basis of the output of the color temperature detector, a recorder means for recording the picture signal passed through the regulator on a recording medium, a device for producing a luminance signal from the output of the color temperature detector, and a computer for calculating the charge accumulating time of the image pickup for the light from the photo-taking lens on the basis of the luminance signal.

8 Claims, 3 Drawing Sheets

FIG. 3
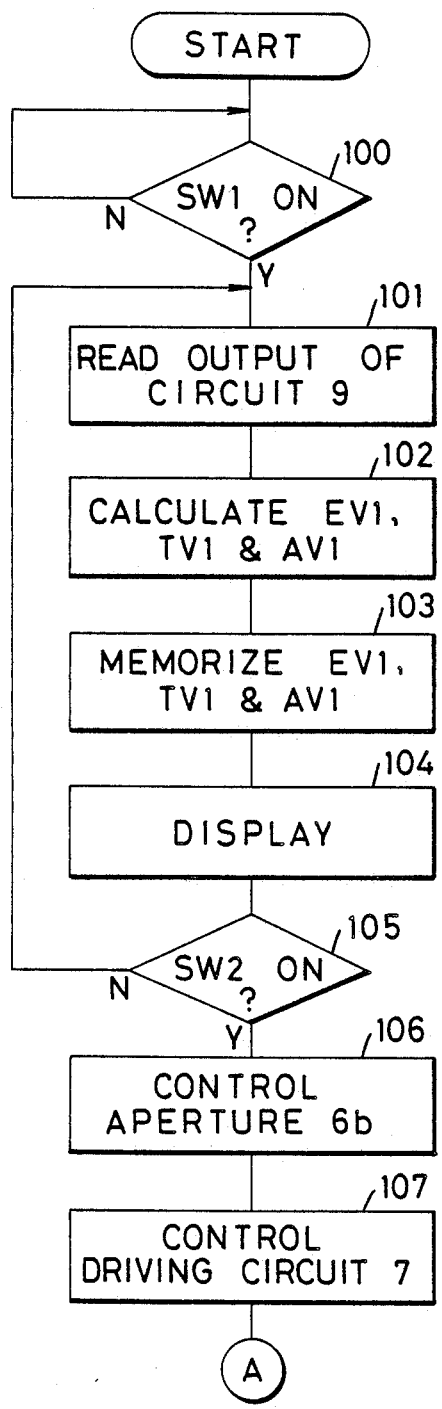
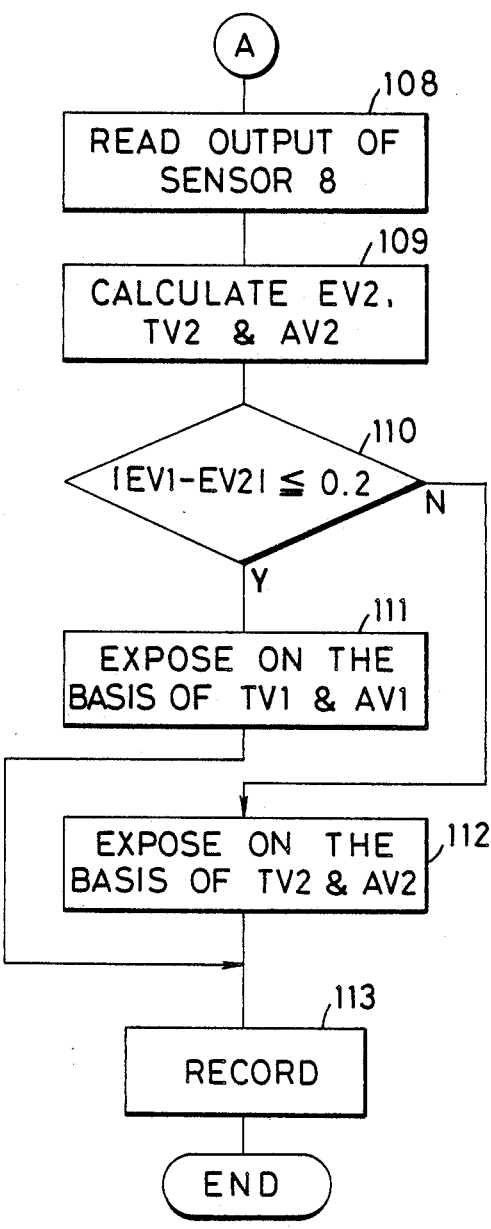

EXPOSURE CONTROL DEVICE IN AN ELECTRONIC STILL CAMERA

BACKGROUND OF THE INVENTION

1. Field of the Invention

This invention relates to an exposure device in an electronic still camera provided with a solid state image pickup device having an electronic shutter function such as CCD.

2. Related Background Art

In an electronic still camera using a solid stage image pickup device having an electronic shutter function, for example, CCD (such as an interline transfer CCD or a frame transfer CCD), the following systems are conceivable as a system for finding a proper exposure value (an aperture value and an exposure time) from the photometering output of an object using the CCD.

A first system is such that before a photographing starting switch (a release switch) is depressed, that is, by the operation of preparing for photographing, such as the half-depressing operation of a release button or the operator touching the release button by his finger, a power source is supplied to the CCD and the circuits around it to video-operate the CCD, and the average value of output levels of one field or any period within one field is found as the photometering output of an object and a proper exposure value (an aperture value and an exposure time) is found from this average value.

A second system is such that after the release switch is depressed (after the half-depressing operation of the release button), a power source is supplied to the CCD and the circuits around it to video-operate the CCD, and the average value of the output levels of one field or any period within one field is found as the photometering output of an object and a proper exposure value (an aperture value and an exposure time) is found from this average value.

However, an exposure control device in which a proper exposure value (an aperture value and an exposure time) is found with the output signal obtained by such video operation of the CCD as the photometering output of the object suffers from the following problems.

According to the above-described first system, the power source must be supplied to the CCD and the circuits around it from the stage of the operation of preparing for photographing before the release switch is depressed, and the CCD and the circuits around it are one of the greatest power consuming sources and therefore, this system is not preferable from the viewpoint of the consumption efficiency of the power source.

Also, the reliable range of the exposure value calculated from the picture signal output of the CCD is of the order of ±2 EV for the proper exposure value, from the limitation in the charge transfer capability or the like of the CCD. When the quantity of light introduced at the aperture value and exposure time set at first deviates from the proper exposure value by ±2 EV or more, the aperture or the exposure time must be controlled after photometering and a photometering operation must be again effected and this operation must be repeatedly effected until the deviation is within ±2 EV from the proper exposure value, and at a point of time whereat the deviation has been within ±2 EV, this output signal is used to obtain proper exposure. Accordingly, there is the undesirable possibility that much time is taken for the photometering for obtaining proper exposure.

Further, where the structure of an electronic still camera is made into the type of a single-lens reflex camera, when an attempt is made to effect photo-metering by the output of a CCD while an object is observed through a photo-taking lens and a finder, it is necessary to cause the object light for photometering to enter the CCD provided behind a quick return mirror and therefore, the structure of the quick return mirror must be constructed of a special member such as a half-mirror, and this is disadvantageous.

On the other hand, in the aforedescribed second system, as in the first system, if the quantity of light introduced at an aperture value and an exposure time set at first after the release switch is depressed deviates from a proper exposure value by ±2 EV or more, the aperture value or the exposure time is controlled and the photometering operation is repeated again and thus, there is the undesirable possibility that very much time is required from after the release switch is depressed until exposure is actually started, and this is a problem as viewed from the viewpoint of operability.

Also, there is no means for knowing the exposure value (the aperture value and the exposure time) before the release switch is depressed and therefore, it is necessary to provide a new photometering sensor such as SPD discretely for the display of the exposure value, and this leads to an increased number of parts and a complicated mechanism.

SUMMARY OF THE INVENTION

The present invention has been made in view of such problems and an object thereof is to provide an exposure control device in an electronic still camera wherein exposure can be accomplished within a short time from the start of the photographing operation on the basis of the result of photometering and which consumes a small amount of electric power.

To achieve the above object, the present invention is designed such that photometering of an object is effected on the basis of the output of means for measuring the color temperature of the object field to regulate the white balance of a picture signal.

With the fact that the output of the means for measuring the color temperature does not always coincide with the luminance of the object being taken into consideration, the present invention is further designed such that the output of a solid state image pickup device such as CCD is also used to measure the luminance of the object. More specifically, the present invention is designed such that when the difference between a first exposure value calculated from the output of the means for measuring the color temperature and a second exposure value calculated from the output of the solid state image pickup device exceeds a predetermined value, exposure is controlled on the basis of the second exposure value calculated from the output of the solid state image pick-up device.

In the exposure control device of the present invention provided with such a construction, an SPD element or the like is usually used as a white balance sensor for obtaining the first exposure value, and this is basically similar to a photometering element used in a conventional camera apparatus.

In the present invention, at the stage of the operation of preparing for photographing, a power source is supplied to the white balance sensor and the first exposure value (the aperture value and the exposure time) is found from the photometering output of the white balance sensor and therefore, the exposure value (the aperture value and the exposure time) obtained from the first photometering output can be displayed by the displaying part of the camera to let the photographer know the exposure value before the shutter release, and since the power source is not supplied to the CCD and the circuits around it, the consumed electric power can be saved greatly. A first stroke of the depressing operation of the release button corresponds to the operation of preparing for photographing, and a second stroke of the depressing operation of the release button corresponds to the operation of starting photographing.

Upon the start of the photographing operation by the release switch being depressed, the aperture and the exposure time of the CCD are set so as to match the first exposure value based on the photometering output of the white balance sensor and therefore, the exposure amount of the picture signal introduced at first into the CCD which receives the supply of the power source at the start of the photographing operation and effects the video operation becomes substantially proper, and this exposure amount is almost within the range of $\pm 2$ EV relative to the proper value.

Accordingly, the light introduced at an aperture value determined by the first exposure value can be read out in a short time (e.g. one field period 16.7 ms) after the lapse of the exposure time of the CCD determined by the first exposure value and the object can be accurately photometered by the CCD, and the second exposure value can be found from this photometering output of the object by the CCD.

The first exposure value and the second exposure value strictly yield an error because the detecting areas therefor differ. Therefore, the first and second exposure values are compared with each other and when the two coincide with each other or the difference between the two is within a predetermined range, the photographing operation is effected at the first exposure value, and when the difference between the two exceeds the predetermined range, the aperture and/or the exposure time of the CCD is adjusted by the second exposure value and the photographing operation is effected, and since the second exposure value is based on the video output of the CCD which is an image pickup device, the exposure error can be greatly reduced.

BRIEF DESCRIPTION OF THE DRAWINGS

FIG. 3 is a flow chart showing the operation of the present invention.

DESCRIPTION OF THE PREFERRED EMBODIMENT

Figure 1:
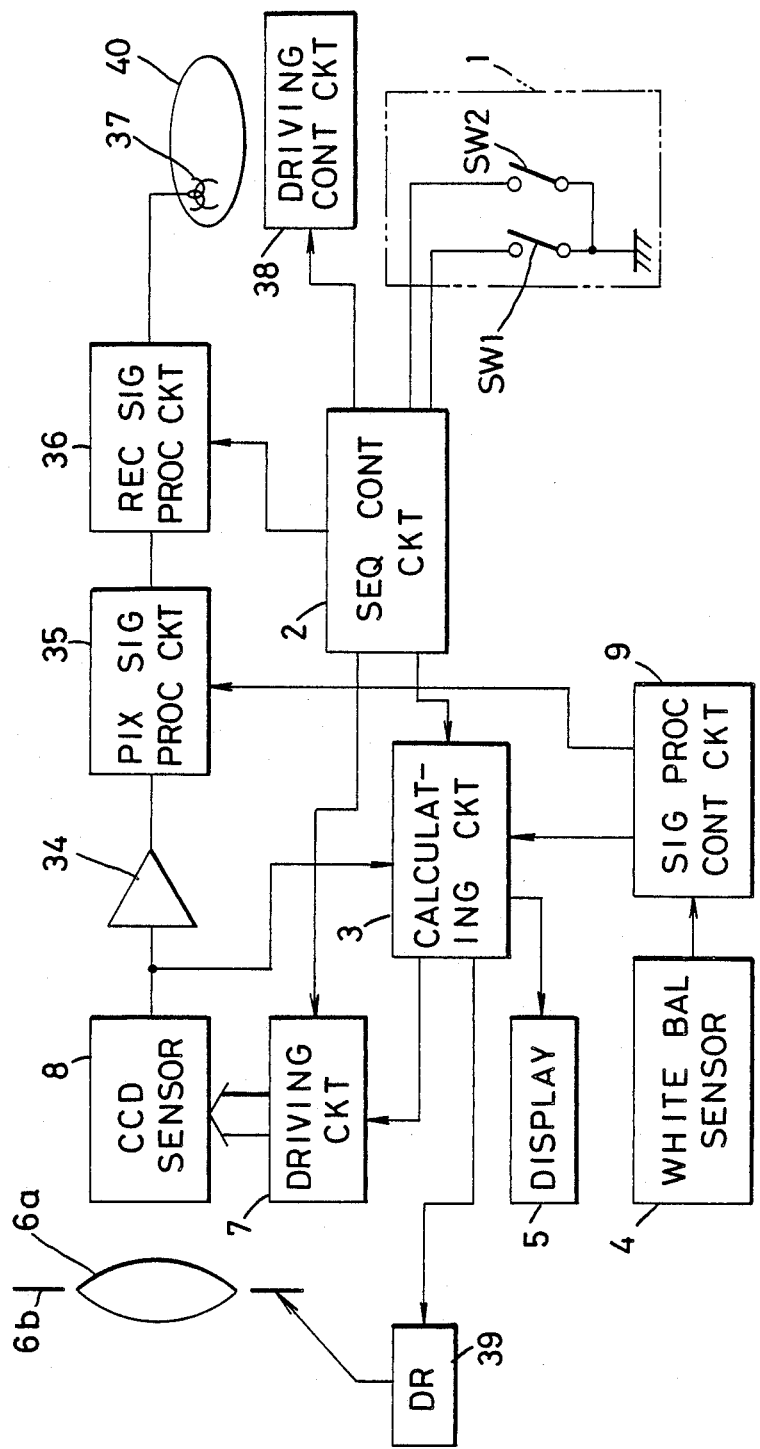
FIG. 1 is a block diagram showing an embodiment of the present invention.

FIG. 1 is a block diagram showing an embodiment of an electronic still camera provided with the exposure control device of the present invention.

The construction of FIG. 1 will hereinafter be described with the operation thereof. The reference numeral 1 designates a half-depression release signal generating circuit designed such that a half-depression switch SW1 is closed by the half-depressing (the first stroke) operation of a release button to generate a half-depression signal and when the release button is further depressed (the second stroke) from the half-depressed state, a release switch SW2 is closed to generate a release signal.

When the half-depression signal is generated from the half-depression release signal generating circuit 1, a power source is supplied to a sequence control circuit 2, a calculating circuit 3, a white balance sensor 4, a signal process control circuit 9 and a displaying part 5 to thereby effect the operation of preparing for photographing. Also, when the release signal is generated from the half-depression release signal generating circuit 1, the power source is supplied to the entire circuit system to thereby effect a photographing operation. The white balance sensor 4 detects the color temperature of the outside without the intermediary of a phototaking optical system 6a, and is described, for example, in U.S. Pat. No. 4,506,290.

The calculating circuit 3 has the function as first photometering means which calculates a first exposure value EV1 for obtaining proper exposure, a first aperture value AV1 satisfying the first exposure value EV1, and a first exposure time TV1 on the basis of the photometering output of the white balance sensor 4 at the stage of the operation of preparing for photographing when the half-depression signal has been generated, and the function as second photometering means which finds a second exposure value EV2 for obtaining proper exposure, a second aperture value AV2 satisfying the second exposure value EV2, and a second exposure time TV2 from the photometering output of an object found with an output signal obtained in the video operation of CCD when the release signal has been generated as the average value. Further, the calculating circuit 3 compares the second exposure value EV2 with the first exposure value EV1, and if these two values are within a predetermined range, e.g. $\pm 0.2$ EV, effects a photographing operation in which it reads out a picture signal in the exposure control by the first exposure value EV1 and records it, and if the difference $|EV1-EV2|$ between the first and second exposure values is outside the predetermined range, e.g. $\pm 0.2$ EV, controls the aperture and/or the exposure time of CCD 8 on the basis of the photometering output of the object obtained in the video operation of CCD 8, i.e., the second exposure value, and effects the photographing operation.

Of course, the output by the second photometering means (for example, a picture signal corresponding to one field) is not recorded in a floppy disc 40.

Also, if the aperture is controlled when exposure control is to be effected by the second photometering means, time therefore will be required, e.g., 1/60 sec. will be required for the second photometering and 1/60 sec. will be required for the aperture control and thus, exposure will be started in the total 1/30 sec., and when it is desired to shorten this time, if the aperture is not controlled and exposure control is effected by only the control of the exposure time of the CCD, there will be a delay of 1/60 sec. If the second photometered value does not greatly differ from the first photometered value, the aperture need not be controlled and exposure control will be sufficiently possible by only the control of the exposure time of the CCD.

The calculating circuit 3 having the functions as such first and second photometering means and exposure control means will now be described in greater detail. When the half-depression signal is generated from the half-depression release signal generating circuit 1 by the half-depression of the release switch, the signal process circuit 9 outputs to the calculating circuit 3 a photometering signal based on the light-receiving output of the object detected by the white balance sensor 4. In response to the photometering signal from the signal process circuit 9, the calculating circuit 3 effects a first photometering calculation process for finding the aperture value AV1 and the exposure time TV1 for obtaining a proper exposure value. The aperture value AV1 and the exposure time TV1 (the shutter speed) calculated by the calculating circuit 3 are output to the displaying part 5, and the aperture value AV1 and the exposure time TV1 (the shutter speed) are displayed in the displaying part 5, whereby the photographer can know the exposure state at the stage of the operation of preparing for photographing.

Subsequently, when the release signal is generated from the half-depression release signal generating circuit 1, the power source is supplied to the entire circuit system and the photographing operation is started, whereupon an aperture control signal based on the first exposure value obtained in the first photo-metering calculation process is first output from the calculating circuit 3 to a driver 39 for driving an aperture 6a provided in the photo-taking optical system 6a to thereby effect aperture control and at the same time, an exposure time setting signal based on the first exposure value is output to a CCD driving circuit 7.

As a result, an image is formed on the CCD 8 by the photo-taking lens 6a. In the present embodiment, it is to be understood that the sensor 8 is an interline transfer CCD. Subsequently, the CCD driving circuit 7 receives an exposure start signal from sequence control circuit 2 and sweeps the unnecessary charges present in the light-receiving portion and vertical transfer portion of the CCD 8. In this case, the vertical transfer portion and horizontal transfer portion are operated faster than the usual driving speed. Exposure is started from the termination of this sweeping of the unnecessary charge. When the exposure time based on the first exposure value set by the calculating circuit 3 is reached, the CCD driving circuit 7 transfers the charges accumulated in the light-receiving portion of the CCD 8 to the vertical transfer portion and starts the operation of the vertical transfer portion and horizontal transfer portion, and the CCD 8 outputs a picture signal obtained on the basis of the first exposure value EV1. The picture signal read out by the video operation of the CCD 8 is input to the calculating circuit 3, which finds the photometering output of the object by the CCD 8, for example, from the average value of the picture signals corresponding to one field and effects a second photometering calculation process in which it finds the second exposure value EV2 by this photometering output.

If in this manner, the second exposure value EV2 has been calculated from the photometering output based on the video operation of the CCD 8, it is compared with the first exposure value EV1, and if the two exposure values are coincident with each other or within a predetermined range, e.g. within the range of ±0.2 EV, the picture signal obtained by the video operation of the CCD 8 is recorded on the floppy disc 40 through an amplifier 34, a picture signal process circuit 35, a record signal process circuit 36 and a head 37 without the aperture control and exposure time by the first exposure value being changed. Of course, at this time, the tracking control of the head 37 and the constant-speed rotation of the floppy disc 40 are effected by a driving control circuit 38. The record signal process circuit 36 modulates the frequency of the picture signal from the circuit 35 and records it on the disc 40.

If, on the other hand, in the calculating circuit 3, the result of the comparison between the first and second exposure values EV1 and EV2 is outside the predetermined range, e.g., ±0.2 EV, the aperture control signal by the second exposure value EV2 obtained by the second photometering calculation process is output to a driver 39 and an exposure time based on the second exposure value EV2 is set in the CCD driving circuit 7, and correction is made to the exposure state of the CCD 8 based on the second exposure value EV2, and likewise, a photographing operation is performed in which the field signal read out from the CCD 8 by the video operation is recorded on the floppy disc 40.

Figure 2:
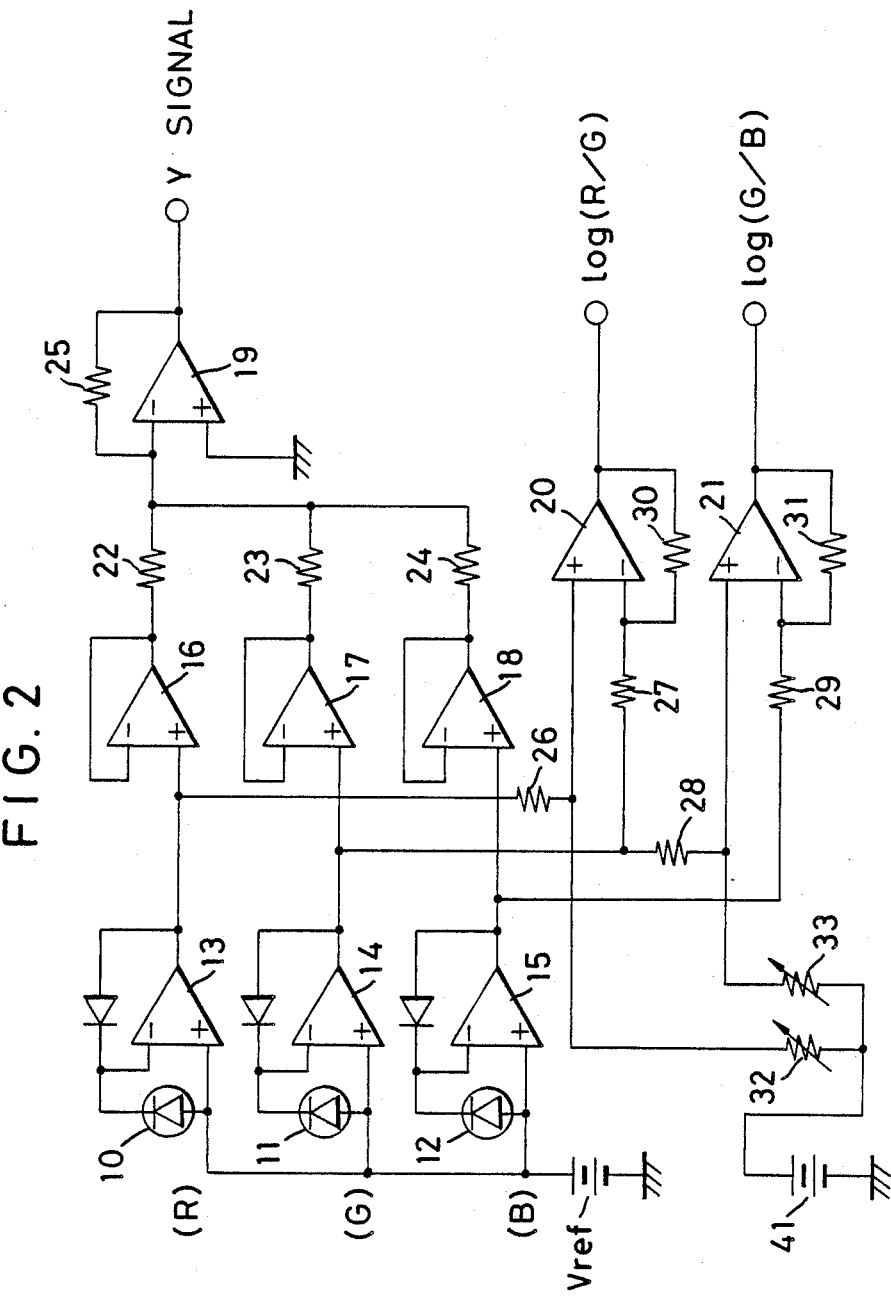
FIG. 2 is a circuit block diagram showing a white balance sensor in the embodiment of FIG. 1 and an embodiment of the signal process circuit thereof.

FIG. 2 is a circuit block diagram showing the white balance sensor 4 in the embodiment of FIG. 1 and an embodiment of the signal process circuit 9 thereof.

In FIG. 2, the reference numerals 10, 11 and 12 designate SPD's constituting the white balance sensor. SPD 10 has a red filter, SPD 11 has a green filter, and SPD 12 has a blue filter, and these filters are designated by R, G and B, respectively.

The light-receiving outputs of the white balance sensor comprising such SPD's 10–12 are logarithmically compressed by logarithmic compression circuits 13, 14 and 15, respectively, and are output. The outputs of the logarithmic compression circuits 13–15 pass through buffers 16, 17 and 18, respectively, whereafter they are combined by an amplifier 19 with a suitable combination ratio by resistors 22–25, and a luminance signal (Y signal) is obtained as the combined output of the amplifier 19. This luminance signal output from the amplifier 19 provides the photometering output of the object obtained by the white balance sensor, and is input to the calculating circuit 3 of FIG. 1.

On the other hand, the outputs of the logarithmic compression circuits 13–15 are imparted a bias voltage from a bias voltage source 41 at a suitable division ratio of resistors 26–33, and then are combined by amplifiers 20 and 21, respectively, and the output signal of the amplifier 20 provides a log (R/G) signal and the output of the amplifier 21 provides a log (G/B) signal. The output signals of these amplifiers 20 and 21 are input as white balance control signals to the picture signal process circuit 35 of FIG. 1.

The calculating circuit 3 and sequence control circuit 2 of the present invention can be constructed of a microcomputer, and FIG. 3 is a flow chart showing the operation of this microcomputer.

At step 100, whether the half-depression switch SW1 has been closed is judged, and when the half-depression switch SW1 is closed, shift is made to step 101, where the Y signal shown in FIG. 2 is read, and at step 102, the first exposure value EV1, the first aperture value AV1 and the first exposure time TV1 are calculated, and at step 103, the first exposure value EV1, the first aperture value AV1 and the first exposure time TV1 are memorized in an internal memory. At step 104, the first aperture value AV1 and the first exposure time TV1 memorized at step 103 are displayed by the displaying part 5. At step 105, whether the release switch SW2 has been closed is judged, and if the release switch SW2 is not closed, shift is made to step 101, and when the release switch SW2 is closed, shift is made to step 106, where the aperture 6b is controlled on the basis of the first aperture value AV1, and at step 107, the driving circuit 7 is controlled on the basis of the first exposure time TV1. At step 108, the output of the sensor 8 conforming to the first aperture value AV1 and the first exposure time TV1 is read, and at step 109, the second exposure value EV2, the second aperture value AV2 and the second exposure time TV2 are calculated on the basis of the output read at step 108, and at step 110, whether the difference $|EV1-EV2|$ between the first and second exposure values exceeds a predetermined value 0.2 is judged, and if the difference does not exceed the predetermined value, exposure is controlled by the first aperture value AV1 and the first exposure time TV1 at step 111, and if the difference exceeds the predetermined value, exposure is controlled by the second aperture value AV2 and the second exposure time TV2 at step 112. At step 113, the output from the CCD 8 obtained at one of steps 111 and 112 is recorded on the disc 40.

In the embodiment of the present invention, the CCD 8 is given an electric shutter function by the driving circuit 7, but the present invention can also achieve its object if a shutter is provided between the CCD 8 and the photo-taking lens.

Also, the output of the white balance sensor 4 is used when the first exposure value is calculated, but the present invention also covers a case where a conventional photometering device is provided discretely from the white balance sensor so that the first exposure value may be found on the basis of the output from the photometering device. In such case, the aperture and the CCD can be controlled by the output of the photometering device and the luminance distribution of the object can be accurately measured from the output of the CCD.

We claim:

1. An electronic still camera having a photo-taking lens, image pickup means for accumulating therein charges according to the intensity distribution of the incident light from an object passed through said photo-taking lens, and recording means for recording the picture signal from said image pickup means on a recording medium, said electronic still camera including:
    calculating means for calculating an exposure value of said image pickup means, said calculating means calculating a first exposure value for said image pickup means prior to the operation of said image pickup means for producing the picture signal;
    starting means for causing said image pickup means to start the production of the picture signal after the calculation of said first exposure value by said calculating means;
    exposure control means for controlling the charge accumulating time of said image pickup means, said exposure control means being responsive to said starting means to control the charge accumulating time of said image pickup means on the basis of said first exposure value, said calculating means calculating a second exposure value for said image pickup means on the basis of the picture signal from said image pickup means; and
    driving control means for driving said image pickup means dependent upon a relationship between said first exposure value and said second exposure value.

2. An electronic still camera according to claim 1, which further comprises color temperature detecting means for detecting the color temperature of the outside of said electronic still camera, wherein said calculating means calculates said first exposure value on the basis of the output of said color temperature detecting means.

3. An electronic still camera having a photo-taking lens including an aperture, color temperature detecting means for detecting the color temperature of the outside of said electronic still camera including an object, image pickup means for accumulating therein charges according to the incident light from the object passed through said photo-taking leans, regulating means for regulating the picture signal from said image pickup means on the basis of the output of said color temperature detecting means, and recording means for recording the picture signal passed through said regulating means on a disc, said electronic still camera including:
    calculating means for calculating an exposure value of said image pickup means, said calculating means calculating a first exposure value for said image pickup means on the basis of the output of said color temperature detecting means prior to the operation of said image pickup means for producing the picture signal;
    starting means for causing said image pickup means to start the production of the picture signal after the calculation of said first exposure value by said calculating means; and
    exposure control means for controlling the charge accumulating time of said image pickup means with respect to an image of the object and the value of said aperture, said exposure control means being responsive to said starting means to control the value of said aperture and the charge accumulating time of said image pickup means on the basis of said first exposure value, said calculating means calculating a second exposure value for said image pickup means on the basis of the picture signal from said image pickup means, said exposure control means selecting one of said first and said second exposure values, controlling said aperture and said image pickup means on the basis of said selected exposure value and causing said recording means to record the picture signal on said disc.

4. An electronic still camera having a photo-taking lens including an aperture, color temperature detecting means for detecting the color temperature of the outside of said electronic still camera including an object, image pickup means for accumulating therein charges according to the intensity distribution of the incident light from the object passed through said photo-taking lens, regulating means for regulating the picture signal from said image pickup means on the basis of the output of said color temperature detecting means, and recording means for recording the picture signal passed through said regulating means on a disc, said electronic still camera including:
    calculating means for calculating an exposure value of said image pickup means, said calculating means calculating a first exposure value for said image pickup means on the basis of the output of said color temperature detecting means prior to the operation of said image pickup means for producing the picture signal;
    starting means for causing said image pickup means to start the production of the picture signal after the calculation of said first exposure value by said calculating means;
    exposure control means for controlling the value of said aperture and the charge accumulating time of said image pickup means, said exposure control means being responsive to said starting means to control the value of said aperture and the charge accumulating time of said image pickup means on the basis of said first exposure value, said calculating means calculating a second exposure value for said image pickup means on the basis of the picture signal from said image pickup means; and means for detecting that the difference between said first exposure value and said second exposure value exceeds a predetermined range and producing a detecting signal, said exposure control means being responsive to said detection signal to control the value of said aperture and the charge accumulating time of said image pickup means on the basis of said second exposure value.

5. An electronic still camera according to claim 4, wherein said recording means records a picture signal according to said first exposure value on said disc when the difference between said first exposure value and said second exposure value does not exceed said predetermined range, and records a picture signal according to said second exposure value on said disc when the difference between said first exposure value and said second exposure value exceeds said predetermined range.

6. An electronic still camera according to claim 5, wherein said calculating means produces a luminance signal on the basis of the output of said color temperature detecting means and calculates said first exposure value on the basis of the produced luminance signal.

7. An electronic still camera according to claim 6, further having displaying means for displaying the value of said aperture according to said first exposure value and the charge accumulating time of said image pickup means.

8. An electronic still camera having a photo-taking lens including an aperture, color temperature detecting means for detecting the color temperature of the outside of said electronic still camera including an object, image pickup means for accumulating therein charges according to the incident light from the object passed through said photo-taking lens, regulating means for regulating the picture signal from said image pickup means on the basis of the output of said color temperature detecting means, and recording means for recording the picture signal passed through said regulating means on a disc, said electronic still camera including:

calculating means for calculating an exposure value of said image pickup means, said calculating means calculating a first exposure value for said image pickup means on the basis of the output of said color temperature detecting means prior to the operation of said image pickup means for producing the picture signal;

starting means for causing said image pickup means to start the production of the picture signal after the calculation of said first exposure value by said calculating means; and exposure control means for controlling the charge accumulating time of said image pickup means with respect to an image of the object and the value of said aperture, said exposure control means being responsive to said starting means to control the value of said aperture and the charge accumulating time of said image pickup means on the basis of said first exposure value, said calculating means calculating a second exposure value for said image pickup means on the basis of the picture signal from said image pickup means, said exposure control means causing said recording means to record the picture signal on said disc dependent upon a relationship between said first exposure value and said second exposure value.

* * * * *